(12) United States Patent
Deppieri et al.

(10) Patent No.: US 8,915,443 B2
(45) Date of Patent: Dec. 23, 2014

(54) METHOD FOR DECODING A LINEAR BAR CODE

(75) Inventors: Francesco Deppieri, Mira (IT); Rinaldo Zocca, Argelato (IT)

(73) Assignee: Datalogic IP Tech S.R.L., Lippo di Calderara di Reno (Bologna) (IT)

( * ) Notice: Subject to any disclaimer, the term of this patent is extended or adjusted under 35 U.S.C. 154(b) by 143 days.

(21) Appl. No.: 13/517,345

(22) PCT Filed: Dec. 21, 2009

(86) PCT No.: PCT/IB2009/055865
§ 371 (c)(1),
(2), (4) Date: Jun. 20, 2012

(87) PCT Pub. No.: WO2011/077182
PCT Pub. Date: Jun. 30, 2011

(65) Prior Publication Data
US 2012/0256001 A1 Oct. 11, 2012

(51) Int. Cl.
G06K 7/00 (2006.01)
G06K 7/10 (2006.01)
G06K 7/14 (2006.01)

(52) U.S. Cl.
CPC .................................. G06K 7/14 (2013.01)
USPC ....................... 235/462.41; 235/435; 235/454

(58) Field of Classification Search
CPC ...... G06K 7/14; G06K 7/1408; G06K 7/1413
USPC ......................... 235/462.41, 462.01, 454, 435
See application file for complete search history.

(56) References Cited

U.S. PATENT DOCUMENTS 5,545,887 A * 8/1996 Smith et al. .............. 235/462.08
2005/0145698 A1 * 7/2005 Havens et al. .......... 235/462.12

FOREIGN PATENT DOCUMENTS

WO WO 2008/086498 A2 7/2008

OTHER PUBLICATIONS

International Search Report and Written Opinion dated Jul. 29, 2010 in corresponding International Application No. PCT/IB2009/055865, 8 pages.

* cited by examiner

Primary Examiner — Michael G Lee
Assistant Examiner — Laura Gudorf
(74) Attorney, Agent, or Firm — Duane Morris LLP

(57) ABSTRACT

A barcode decoding method includes obtaining a plurality of scanning lines defining a second set of scanning lines which also comprises a predetermined scanning line. Each scanning line has a first set of pixels, each identified by a first and by a second index. The pixels that are part of the second set of scanning lines define a third set of pixels and, from the pixels of the third set of pixels, it is possible to select a fourth set of pixels to construct an oversampled profile of the barcode, ordering intensity values calculated from the intensity values of the pixels of the fourth set. The pixels of the fourth set include pixels of the predetermined scanning line and further pixels of the third set that do not belong to the predetermined scanning line, to obtain a subpixel resolution that is able to decode the barcode.

29 Claims, 2 Drawing Sheets

METHOD FOR DECODING A LINEAR BAR CODE

BACKGROUND AND SUMMARY OF THE INVENTION

The invention relates to a method for decoding a linear barcode in an image and in particular a method for decoding a linear barcode in an image consisting of pixels.

Symbols consisting of barcodes have become increasingly used to gather significant data from a plurality of different objects. Bar code symbologies of different types have developed over tune. The first symbologies developed such as, for example, RAN/UPC, code 128 and code 39, are called linear symbologies because the data of a symbol extend along a single axis or direction along a succession of black bars and white spaces. Recently, two-dimensional symbologies have also asserted themselves, such as, for example, Datamatrix, PDF-417 and others, that encode the data of a symbol on a two-dimensional surface.

In the past, but also still today, laser-scanning readers have been mainly used to read linear barcodes, in which a laser beam impinges on the code to be read and the light reflected therefrom is received by a device that is sensitive to the light and is converted into an analogue electric signal that constitutes the profile of the barcode. Alternatively to the laser-scanning readers, linear readers are also frequently used that are based on pixel technology, which comprise a sensor consisting of a single line of pixels. The luminous intensity that impinges upon each pixel during a scan is analysed and it is still possible to reconstruct a profile for the linear barcode from the discrete intensity values detected from each pixel, which enables the code to be decoded. If in fact the intensity values of each pixel are considered as sampled values of an analogue signal of the profile of the barcode, it is possible to identify the succession of black bars and white spaces and the width of each bar and/or space, reconstructing, by the well-known techniques of processing of sampled signals, the profile of the code.

A linear symbology normally use elements of two different widths for coding, such as, for example, a narrow and/or wide black bar and a narrow and/or wide space. It should be noted that a barcode element means indifferently a black bar or a white space.

Other linear symbologies use elements of 4 or more different widths and in this case the width of each element is a integral multiple of a minimum value. As a result, the greater the minimum width element inside the image is than the dimension of a pixel, the simpler decoding the barcode will be, the minimum width element also being known as a module.

From the theoretical point of view, according to what has been established by known sampling theory, it could be possible to decode the code with a reader the sensor of which has a resolution of at least one pixel per module. Nevertheless, the more pixels of a scanning line are impinged upon by a luminous intensity that refers to the same module, the more possible it will be to define in detail a transition from a black bar to a white space and vice versa and it will thus be possible to decode the code. For reading two-dimensional codes, readers have affirmed themselves that are based on two-dimensional image sensors i.e. in which a pixel matrix receives an image of the entire linear barcode. In this case, each line or column has a number of pixels that is less than that of a linear pixel sensor, but this does not represent a problem for reading a two-dimensional code.

However, increasingly frequently some applications require being able to read both linear symbols and two-dimensional symbols.

In order to meet this need, it is thus necessary to use readers provided with a two-dimensional sensor but, owing to the smaller number of pixels located on a line or a column, the depth of field and/or the minimum width of the module that can be read are worse that what is obtainable with a linear sensor provided with a greater number of pixels. In particular, the minimum width of the module that can be read with a two-dimensional sensor is greater than what is obtainable with a linear sensor.

Further, using two-dimensional image sensors with a limited number of pixels, is increasingly demanding because it is much cheaper and more widespread than using two-dimensional sensors with a great number of pixels.

If a two-dimensional sensor is used for reading a linear symbology, this symbology is decoded by selecting a determined line of the set of scanning lines, where each scanning line comprises a set of adjacent pixels of the two-dimensional pixel matrix of the sensor. Adjacent pixels are defined as pixels that have at least one side or vertex in common. For example, a horizontal row or a vertical column of the two-dimensional sensor can be considered to be scanning lines.

Similarly to what occurs with linear sensors, the luminous intensity that impinges upon each pixel of the scanning line is analysed to reconstruct a profile for the linear barcode that enable the code to be decoded.

As said previously, sampling theory sets a theoretical limit, i.e. requires the linear barcode to be acquired with a resolution of at least one pixel per module and no interpolation, filtering or oversampling process exists that, applied to a scanning line, enables this limit to be overcome.

For sensors with a low number of pixels, such as pixel matrix readers, if a module has a width that is less than the dimension of one pixel it is not possible to reconstruct the profile of the code and thus decode the linear barcode. Further, even when the above theoretical limit is complied with, if the resolution is greater than this limit by a few fractions, it is known experimentally that it is not possible to decode the linear barcode.

The object of the present invention is to provide a new method for decoding a linear barcode.

A further object is to provide a method for decoding a barcode that enables this decoding even if the information contained in any scanning line is not sufficient to identify all the transitions between the elements of the barcode owing to the insufficient resolution of the sensor.

As the limit set by the sampling theory remains valid also for the method that is the object of the present invention, a further object is to provide a decoding method that has a resolution that is greater than one pixel per module.

A further object is to provide a decoding method that is particularly fast from the computational point of view, i.e. that enables the time to be reduced that is required for decoding the code, According to the invention a method is provided for decoding a barcode.

According to the invention a barcode reader is further provided.

According to the invention a programme is further provided.

Owing to the invention it is thus possible to obtain a method that enables a linear barcode to be decoded inasmuch as an oversampled signal is constructed, i.e. a virtual profile of the code with a subpixel resolution, owing to the use not only of the intensity values of pixels in a predetermined scanning line but also of further pixels, that do not belong to the predetermined scanning line. In other words, as no scanning line exists that permits decoding in the event of resolution that is too low, information is used that is present in the linear barcode but is displaced with respect to the scanning line, to increase the number of samples with which to reconstruct the profile.

Further pixels are thus added to the pixels of the predetermined scanning line.

In this manner, the limit set by the sampling theorem is overcome and a barcode can be decoded even when the resolution is less than one pixel per module. As a result barcode readers can be advantageously used that integrate two-dimensional sensors that nevertheless at the same time ensure great flexibility both for reading linear symbols and reading two-dimensional symbols.

As a result, to an even greater extent, barcode readers can be made that integrate cheap linear sensors, it always being possible to decode a linear barcode even when the resolution is less than one pixel per module.

BRIEF DESCRIPTION OF THE DRAWINGS

The invention can be understood and implemented better with reference to the enclosed drawings that illustrate embodiments thereof by way of non-limiting example, in which.

DETAILED DESCRIPTION

Figure 1:
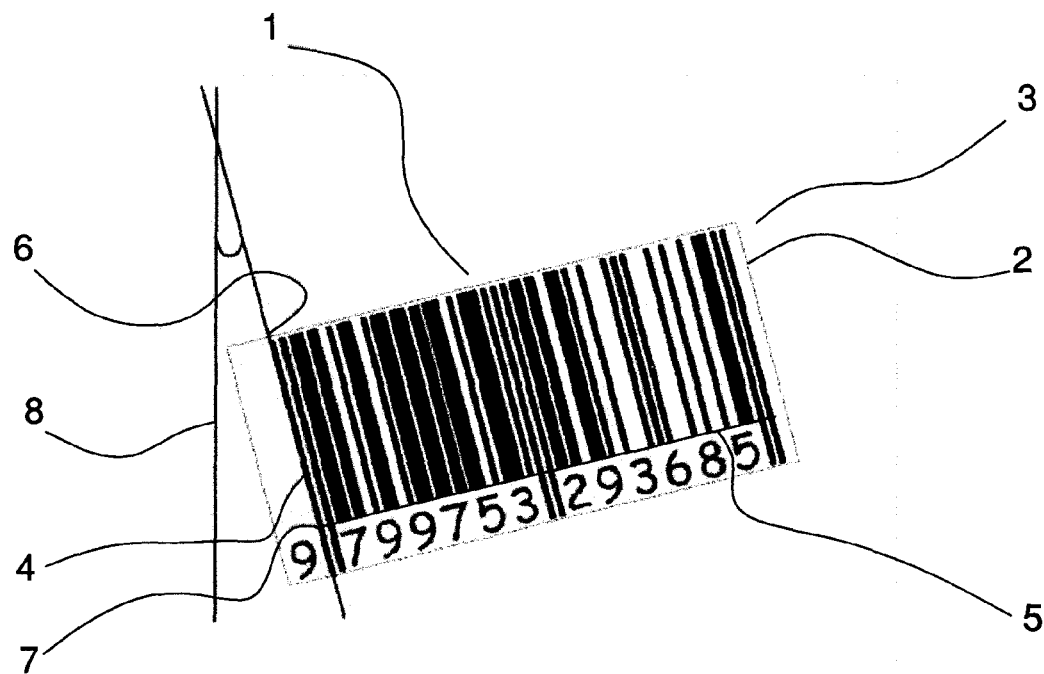
FIG. 1 is an image of a barcode, as it is acquired by a sensor having a two-dimensional pixel matrix.

With reference to FIG. 1, an image is shown, as acquired by a sensor (not shown) consisting of a two-dimensional set of pixels 100, it which a linear barcode 1 is present. It should be noted that the linear barcode 1 of FIG. 1 is represented by a succession of black bars and white spaces on a white background.

The linear barcode has an outline 2, which is associable with the linear barcode after acquisition, which enables the code 1 to be separated externally from the background. It should be noted that, as shown in FIG. 1, inside the outline 2 of the linear barcode there are further data in addition to the succession of black bars and white spaces, such as, for example, numbers, which are however not relevant for the purpose of the present invention and will not be considered. Inside the outline 2 it is further possible to identify a portion of image 3 that excludes the numbers present in the barcode, comprising the succession of black bars and white spaces and a first black bar 4 from which the succession of black bars and white spaces starts. It should be noted that the portion of image 3 is arranged inside a rectangle 5 that partially coincides with the outline 2, a side of which is defined by the first black bar 4. This portion of image 3 has a height that defines the height of the barcode, which is calculated as the distance between a first end vertex 6 and a second end vertex 7 of the first black bar 4. The first vertex 6 is defined by the intersection between the black bar 4 and the outline 2 of the linear barcode whilst the second vertex is arranged on the perimeter of the rectangle 5 containing the succession of black bars and white spaces.

It should be noted that the linear barcode 1 is arranged tilted with respect to a reference axis, in particular a vertical reference axis 8, which for ease of representation is shown as a half line outside the linear barcode 1. For the sake of simplicity, reference has been made to a vertical reference system 8. It should nevertheless be noted that it is possible to identify a different reference axis without any loss of generality, for example a horizontal reference system.

In particular, between the vertical reference 8 and the first black bar there is defined an angle a, the calculation of which is important for the purposes of the present invention, as will be better illustrated below. It is necessary to specify that in the case of a sensor consisting of a two-dimensional set of pixels 100 that are aligned and arranged in rows and columns the vertical reference 8 is simply given by one of the columns and/or of the rows of the set of pixels 100. If on the other hand there is not the aforesaid alignment as the pixels are not square but polygonal in shape, this vertical reference 8 would be made by the external margins of the sensor.

A pixel 100 is the smallest autonomous element that is able to be impinged upon by the luminous intensity reflected by the image and, inside the two-dimensional set of pixels 100, each pixel 100 is characterised by the position thereof and by an intensity value, which in the case in point is an integer that is variable in a discrete manner on a scale of greys from 0, which indicates black, to 255, which indicates white. If a pixel 100 is impinged upon by a portion of both white and black image it will have a mediated intensity value thus expressing an average between the various intensities that impinge upon the pixel.

Figure 2:
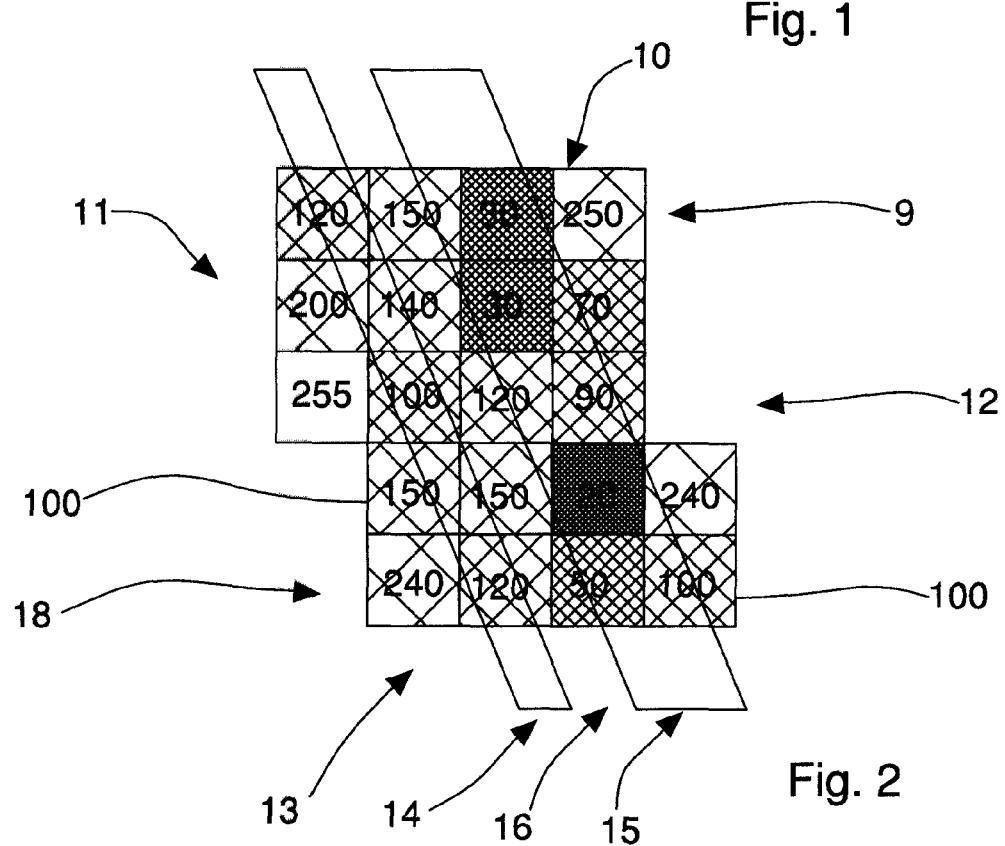
FIG. 2 is an illustration in which a portion of image is shown that is acquired by the sensor and received by pixels belonging to a set of scanning lines, in which each pixel has a respective luminous intensity value.

FIG. 2 shows a set of pixels 100 that receive the portion of the image 3 in which the barcode 1 is present, and in which each pixel 100, which has a number expressing its luminous intensity value, belongs to a respective scanning line 9. In particular, each scanning line 9 comprises a first set 10 of pixels 100, ordered according to a first index.

FIG. 2 shows a plurality of scanning lines 9, i.e. a second set 11 of scanning lines 9, in which the scanning lines are ordered according to a second index. The second set 11 of scanning lines 9, in which each comprises a respective first set 10 of pixels 100, therefore enables a third set 12 of pixels to be defined, in which each pixel 100 is identified by its position, expressed by the first index and the second index.

If a two-dimensional representation of a pixels matrix 100 is considered, the first index is a column index, which conventionally starts from 0 and increases as it moves right, whilst the second index is a row index, which conventionally starts from 0 and increases by moving upwards. In FIG. 2 a portion of the barcode to be decoded is further shown, which gives origin to the luminous intensity values received from each pixel 100. The barcode 1 comprises a first wide white space 13, a first narrow black bar 14, a second wide black bar 15 and a narrow white space 16 interposed between the narrow black bar 14 and the wide black bar 15. The first black bar 14 and the second black bar 15 are shown only schematically in FIG. 2 inasmuch as the values of the luminous intensity of the pixels 100 do not enable the position of the bars to determined immediately, the resolution being less than one pixel per module.

In fact, by examining a predetermined scanning line 18, such as, for example, the scanning line corresponding to the row arranged lower in FIG. 2, to which we conventionally assign a row index 0, it is noted how it is not possible to reconstruct a succession of white spaces and black bars, inasmuch as the sequence of the luminous intensity values of the pixels is 240, 120, 50 and 100 and this sequence does not enable the presence of the narrow black bar 14 and of the narrow white space 16 to be recognised.

By considering for example the first black bar 14 it can in fact be noted that the first black bar 14 is entirely contained in a single pixel 100, i.e. the pixel 100 with a row index 0 and a column index 1, assuming that conventionally a column index 0 is assigned to the pixel 100 the intensity of which, in FIG. 2, is equal to 240. It is thus not possible to identify the transition of the first black bar 14 to the narrow white space 16.

It is thus clear that each consideration that is valid for the first black bar 14 and the narrow white space 16 is similarly valid for each other element of the succession of black bars and white spaces in the barcode. As the barcode 1 is in fact tilted with respect to the vertical reference 8 and the information along the entire height of the barcode 1 is the same, adjacent scanning lines 9 in the second set 11 receive from the same succession of bars and spaces a luminous intensity that is the function of the row to which they belong and of a first parameter that is associated with the tilt of the barcode with respect to a vertical reference.

In particular, starting from the row 0 and proceeding upwards in the row 1, the first black bar 14, just like each element of the code, will be moved to the left by a fraction of pixel, proportional to the angle α of tilt of the barcode 1 with respect to the vertical reference 8. By considering the pixel to be a square the side of which has a dimension equal to the unit, for each row increase it is possible to identify a shift S that is equal to the tangent of α. In other words, the first parameter associated with the tilt of the currently identified barcode is the tangent of α but the dependence of the angle α can also be expressed by a different formula, without thereby any loss of generality. In fact, by selecting a fourth ordered set 17 of pixels 100 from the third set 12 of pixels, i.e. by choosing pixels 100 that are also distant from one another, but in an orderly manner as will be explained better below, it is possible to assign intensity values of the pixels 100 of the fourth set 17 to the same element of the barcode and thus construct an oversampled profile of the transition from the first white space 13 to the first black bar 14 and from the first black bar 14 to the second white space 16. By using the intensity values of the pixels 100 of the fourth set 17, illustrated in FIG. 3, to construct the oversampled signal it is thus possible to decode the barcode 1.

The fourth set 17 of pixels 100 comprises a number of pixels 100 that is greater than the number of pixels of the first set 10. In other words, in the profile of the barcode that is reconstructable from a single scanning line further samples are added at fractions of pixels to construct an oversampled profile and a subpixel resolution is thus obtained that is able to decode the barcode.

This method, which for simplicity is illustrated below only to identify a particular black bar, is clearly applicable for decoding the entire barcode, and in particular the succession of elements of the barcode shown in FIG. 2.

Let us now consider a tabular representation of the intensity values of the pixels 100 of FIG. 2 and let us assume that the index (0.0) pixel 100 is the pixel 100 in the bottom left-hand corner.

Table 1, inserted below, shows that:

TABLE 1

|     | C.−1 | C.0 | C.1 | C.2 | C.3 |
| --- | --- | --- | --- | --- | --- |
| R.4 | 120 | 150 | 30  | 250 |     |
| R.3 | 200 | 140 | 30  | 170 |     |
| R.2 | 255 | 100 | 120 | 90  |     |
| R.1 |     | 150 | 150 | 20  | 240 |
| R.0 |     | 240 | 120 | 50  | 100 |

If the barcode shown in FIG. 2 is tilted by an angle equal to 21.8°, the value of the shift S of the black bar from one row to the adjacent row is equal to the tangent of 21.8°, i.e. 0.4 fractions of pixels. Every 5 rows, there will be a shift of an integer number of pixels 100 equal to 2. In other words, with a shift S equal to 0.4, there is a modularity of 2 pixels and of 5 possible shift values S, after which the black bar repeats its shift with the same values and therefore, although examining a scanning row identified by a row index equal to 6, the sixth scanning row would not add further additional information.

It is possible to calculate, for each pixel 100 of the third set 12, a respective shift value S. The shift value S is obtained by multiplying the row index of the pixel to the tangent of α and adding the result to the column index of the pixel. If R is the row index and C is the column index, it is possible to write the shift value S according to the Formula 1, set out below:

$$S = \tan(\alpha) * R + C \quad \quad 1)$$

From the pixel (0.0) we calculate, for each pixel belonging to the third set 12, a corresponding shift value S and we consider a tabular representation of such shift values S. Table 2, inserted below, shows that:

TABLE 2

|     | C.−1 | C.0 | C.1 | C.2 | C.3 |
| --- | --- | --- | --- | --- | --- |
| R.4 | 0.6  | 1.6 | 2.6 | 3.6 |     |
| R.3 | 0.2  | 1.2 | 2.2 | 3.2 |     |
| R.2 | −0.2 | 0.8 | 1.8 | 2.8 |     |
| R.1 | −0.6 | 0.4 | 1.4 | 2.4 | 3.4 |
| R.0 | −1.0 | 0   | 1.0 | 2.0 | 3.0 |

By analysing the shift values S calculated in Table 2 and processing the shift values S according to a predetermined order, an ordered fifth set of shift values (S) is obtained. In particular, the shift values S are processed ordering the shift values S in ascending order and each shift value of the fifth set is associated with a respective pixel 100, which is that from which it has been calculated.

Table 3, inserted below, shows that:

TABLE 3

| S   | R. | C.  |
| --- | --- | --- |
| 0   | 0   | 0   |
| 0.2 | 3   | −1  |
| 0.4 | 1   | 0   |
| 0.6 | 4   | −1  |
| 0.8 | 2   | 0   |
| 1.0 | 0   | 1   |
| 1.2 | 3   | 0   |
| 1.4 | 1   | 1   |
| 1.6 | 4   | 0   |
| 1.8 | 2   | 1   |
| 2.0 | 0   | 2   |
| 2.2 | 3   | 1   |
| 2.4 | 1   | 2   |
| 2.6 | 4   | 1   |

TABLE 3-continued

| S | R. | C. |
|---|----|----|
| 2.8 | 2 | 2 |
| 3.0 | 0 | 3 |

By then selecting the pixels 100 of the third set 12 in the order indicated by the shift values S of the fifth set, the ordered fourth set 17 of pixels 100 is identified, which are the pixels 100 that are important for the purposes of the construction of the oversampled profile. From the intensity values of the pixels 100 of the fourth set 17 it is possible to obtain calculated intensity values, for constructing the oversampled profile of the barcode, as will be explained better below.

To each pixel 100 of the fourth set 17 is assigned an intensity value and thus by arranging the intensity values of the pixels 100 of the fourth set 17 in the order indicated by the shift values S of the fifth set, further samples are inserted at fractions of pixels with respect to the samples available in a single scanning line.

In practice, the fourth set 17 comprises pixels 100 of the predetermined scanning line 18 and further pixels of the third set 12 that do not belong to the predetermined scanning line 18, but belong to the third set 12.

Figure 3:
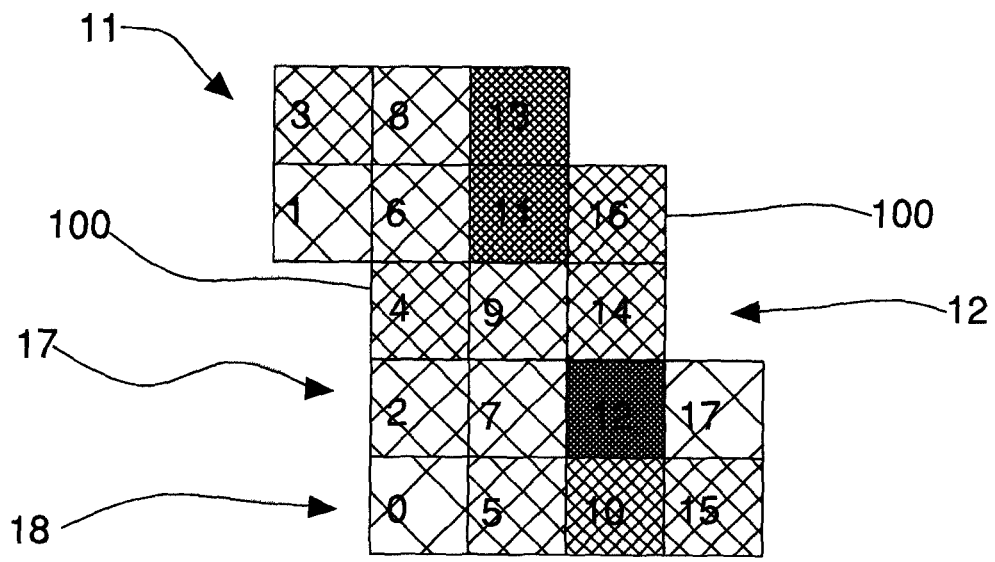
FIG. 3 is an illustration in which the pixels of FIG. 2 are shown, in which each pixel is in the order in which it is sampled according to the method of the present invention.
Figure 4:
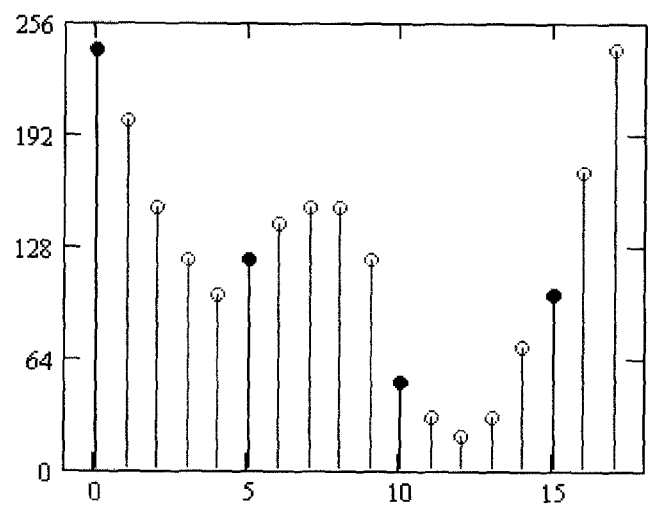
FIG. 4 shows a graphical depiction, which illustrates the oversampled profile of a barcode obtained by interpolating intensity values of pixel according to the present invention, in which shift values are shown on the x axis and intensity values are shown on the y axis.

FIG. 3 illustrates the pixels 100 of the fourth set 17, and each pixel 100 in FIG. 3 has the order in which such pixels 100 have to be sampled to construct correctly a profile of the barcode. The oversampled profile of the barcode, obtained by ordering the intensity values obtained from the intensity values of the pixels 100 of the fourth set 17, is shown in FIG. 4. In particular, in the graph, the intensity values referring to pixels 100 arranged at the scanning line 18, the row index of which is 0, have been shown by a black point and the intensity values referring to pixels 100 of other rows located in the third set 12 of pixels have been shown by a white point. It is possible to note that in the oversampled profile it is possible to identify a minimum intensity value corresponding to the narrow black bar 14 and a maximum intensity value corresponding to the narrow space 16, with which it is possible to identify the transitions of the barcode.

As disclosed above, for an angle equal to 21.8° equidistant sample are obtained from which it is possible to obtain an oversampled profile of the barcode with little computational effort. This is a particular case, that is useful as an example, in which the number of analysed rows is 5 because the sixth scanning row does not add additional information. In general, for a general tilt of the barcode other than 21.8°, there is no repetition of the information after a certain number of scanning rows. Thus the number of scanning lines 9 that is analysable to define the third set of pixels 12 could extend over all the height of the barcode, without limitations and theoretically in general all the pixels 100 of the third set 12 could be usable as pixels 100 of the fourth set 17.

Nevertheless, in practice, the number of pixels 100 that are selected as pixels 100 of the fourth set 17 is predetermined, as will be explained better below, on the basis of an integer number that indicates an oversampling factor F, i.e. the number of further samples for pixels 100, arranged at fractions of pixels, with which it is desired to decode the barcode. The oversampling factor F is thus established to obtain the desired subpixel resolution.

As a result, the oversampled profile of the barcode is obtained by ordering intensity values assigned to intensity values of pixels 100 of the fourth set 17 which are in a total number of K, K being equal to the number of pixels NP of the first set 10 of the predetermined scanning line 18 multiplied by the oversampling factor F, according to the Formula 2, set out below:

$$K=F*NP \qquad 2)$$

It is further necessary to note that for a general tilt of the barcode, in addition to not having repetition of the information after a certain number of scanning lines, the shift values S that are obtained are arranged in a non-uniform manner. Although shift values S can be used that are arranged in a non-uniform manner, this would require additional mathematical calculations that would slow decoding.

For this reason, preferably, when constructing the oversampled profile, intensity values are ordered that are not directly assigned to intensity values of pixels 100 of the fourth set 17, as in the preceding example, but calculated starting therefrom. In particular, equidistant shift values SE are used belonging to a sixth set and the pixels of the fourth set 17 are selected on the basis thereof.

In particular, such equidistant shift values SE are calculated from the oversampling factor F, with which it is desired to decode the barcode.

As a result, between two successive equidistant shift values SE there is a distance T that is expressed in fractions of pixels and is equal to the inversed of the oversampling factor F.

In general, the value T is calculated after defining F according to Formula 3, set out below:

$$T=1/F \qquad 3)$$

The sixth set of equidistant shift values thus comprises an ordered succession of equidistant shift values SE, in which the value of each equidistant shift value SE is equal to an integral multiple of the value T. Assuming that N is an arbitrary integer number and that the sixth set comprises the total number K of equidistant shift values SE, calculated according to Formula 2), each equidistant shift value SE is given by the Formula 4, set out below:

$$SE=N*T, \text{ with } N \text{ from 0 to } K-1. \qquad 4)$$

As already said previously, for the example illustrated in FIGS. 1 to 4 in which the barcode is tilted by an angle equal to 21.8°, samples that are already equidistant are obtained. The oversampling factor F is equal to 5, and from this a distance value T equal to 0.2 derives.

In general, it must, however, be pointed out that an oversampling factor can be used that is also different from 5 provided that it is greater than or the same as 2, for example 8. Nevertheless, an oversampling factor F equal to 5 is used preferably.

As illustrated previously, for each pixel 100 of the third set 12, the respective shift value S according to formula 1 is calculated, and the fifth set of shift values and the fourth set 17 of pixels 100 are obtained, which are selected from the pixels 100 of the third set 12.

Subsequently, each equidistant shift value SE of the sixth set is compared with the shift values S of the fifth set and a first shift value S_EXCESS and a second shift value S_DEFECT are defined that are "near" to the equidistant shift value SE of interest. The first shift value S_EXCESS of interest is the one that has a minimum excess difference with respect to the equidistant shift value and the second shift value S_DEFECT of interest is the one that has a minimum defect difference with respect to the equidistant shift value.

Although the equidistant shift value SE of interest does not exist in the fifth set, and consequently the intensity value of the corresponding pixel 100 could not be attributed thereto, it is possible to calculate an intensity value to be assigned to the corresponding equidistant shift value SE, from intensity values of pixel 100 of the fourth set 17.

A seventh set of intensity values is thus defined, each calculated from intensity values of the fourth set 17, that thus comprises a succession of intensity values, each associated with the corresponding equidistant shift value SE.

In particular, the calculation is carried out by interpolating the intensity value of the pixel 100 corresponding to the first shift value S_EXCESS and the pixel 100 corresponding to the second shift value S_DEFECT and attributing the intensity value obtained from the interpolation to the equidistant shift value SE of interest. In particular, a weighted average is conducted of the intensity value of the pixel 100 corresponding to the first shift value S_EXCESS and of the intensity value of the pixel 100 corresponding to second shift value S_DEFECT, and the weights arise from the minimum excess difference and from the minimum defect difference with respect to the equidistant shift values SE. It is thus possible to calculate a first weight P_EXCESS and a second weight P_DEFECT, respectively according to Formula 5 and Formula 6, set out below:

$$P\_EXCESS=(SE-S\_DEFECT)/(S\_EXCESS-S\_DEFECT) \quad 5)$$

$$P\_DEFECT=(S\_EXCESS-SE)/(S\_EXCESS-S\_DEFECT) \quad 6)$$

According to an alternative version of the method of the present invention, the first weight P_EXCESS and the second weight P_DEFECT are calculated according to formulas that are different from the formulas indicated above.

According to a further alternative version of this method, each equidistant shift value SE of the sixth set is compared with the shift values S of the fifth set and to the shift value SE of interest a luminous intensity value is assigned corresponding to that of the pixel 100 the shift value S of which has the smallest error with respect to the equidistant shift value SE of interest.

According to a further alternative version of this method, each equidistant shift value SE of the sixth set is compared with the shift values S of the fifth set and to the shift value SE of interest a luminous intensity value is assigned deriving from the interpolation of intensity values of a number of pixels equal at least to 3.

According to a further alternative version of this method, which is not illustrated, to construct the oversampled profile of the barcode, the seventh set of intensity values is processed by an equalising filter. In particular, the seventh set of intensity values is transformed into an eighth set of intensity values, in which a corresponding intensity value of the eighth set calculated by equalisation corresponds to each intensity value of the seventh set.

The equalising filter enables the distortion to be corrected that is introduced by sampling and is achieved by a series of known techniques. For example, an estimate of the distortion introduced by sampling is conducted and the equalising filter will correct this distortion by applying an inverse function with respect to the distortion function. An example of equalising filter can, for example, be a sinc function (i.e. sine(x)/x) or a raised-cosine function [1+cos (x)].

It is thus possible to construct the oversampled profile of the barcode both from the seventh set of intensity values, as illustrated previously, or to try to correct the distortion introduced by sampling for subpixel resolutions that are much less than one pixel per module, also starting from the eighth set of intensity values.

In use, in the case of a two-dimensional set of pixels 100, as already said, the outline 2 of the barcode and of the first black bar 4 is initially determined by means of which it is possible to calculate the angle α, between the barcode and the vertical reference 8. Subsequently, a predetermined scanning line 18 and a second set 11 of scanning lines 9 are selected comprising the predetermined scanning line 18 from which it is possible to define the third set 12 of pixels 100, the fifth set of shift values S and the fourth set 17 of pixels 100. In the case of shift values S distributed in a non-uniform manner equidistant shift values SE are preferentially calculated and consequently, for each equidistant shift value a respective intensity value is calculated to create a seventh set of intensity values, calculated from the intensity values of the fourth set 17 of pixels 100. Further, optionally, an equalising filter can be applied to the intensity values of the seventh set, to construct the oversampled profile of the barcode.

It is necessary to point out that the pixel having index (0;0) of the first set 10 of pixels 100 of the predetermined scanning line 18 constitutes the initial pixel for which the first shift value S of the fifth set is calculated, i.e. for which the method of the invention applies. The initial pixel can be selected from all the pixels 100 acquired by the sensor, i.e. can be any pixel 100 inside the barcode 1, without the method losing generality. Nevertheless, it is advantageous to select the initial pixel halfway along the first black bar 4, such that the second set 11 of scanning lines 9 is always contained at the height of the barcode. In particular, the height of said barcode is calculated as the distance between the first end vertex 6 and the second end vertex 7 of the first black bar 4 and the initial pixel is chosen substantially halfway up the height of the first black bar 4.

It should be further known that the method of the present invention may not apply directly to the image originally acquired by the sensor. In fact, in order to make the method of decoding the barcode according to the invention easier, known treatment methods that enable a processed image to be obtained that is more similar to the image of the original barcode can be applied to the image originally acquired by the sensor.

The method of the present invention does not apply to tilts equal to 0°, or integral multiples of 45°, i.e. does not apply when the barcode is tilted by 45° or multiples. When, for example the code is perfectly vertical or horizontal, each scanning line 9 has the same repeated information and if the resolution is insufficient in a predetermined scanning line 18, it will also be insufficient in every other one. The same considerations apply to multiples of 45°, inasmuch as the same information of a predetermined scanning line 18 is moved only by one pixel 100 to the right or left in an adjacent scanning line 9 but is repeated identically to itself.

For this reason, if the barcode is arranged tilted in the image consisting of pixels 100 with respect to a reference axis, the method of the present invention applies only if the angle formed between the barcode and the reference axis is comprised between 0° and 45°, between 45° and 90°, between 90° and 135°, between 135° and 270°, between 270° and 315° and between 315° and 360°.

Otherwise, if the tilt is exactly equal to 0°, or to an integral multiple of 45°, the method according to the present invention changes the reciprocal position between the image comprising the barcode 1 and said sensor consisting of pixels. If, for example, this method is applied to a barcode reader held by a user, it will be the user who, in a subsequent reading attempt, changes the position of the reader.

The barcode shown in FIG. 1 has a tilt comprised between 0° and 45° and in this case, as already said, the first determined index is the column index whilst the second determined index is the row index R. If the barcode has a different tilt, for example comprised between 45° and 90°, the first determined index would be the row index R whilst the second determined index would be the column index C.

By changing the row index R with the column index C and/or by changing the direction according to whether the row index R and/or column index C is positive or negative, it is possible to analyse the barcode for any tilt.

Lastly, it should be noted that the method of the present invention does not involve costly calculations from the computational point of view. In fact, it is usually necessary to calculate for each pixel 100 of the third set 12 a respective shift value S but from the fifth set of shift values S it is necessary only to order in ascending order the shift values S. Methods of known type exist for ordering in ascending order a numerical set, which are fast and simple and this enables the method of the present invention to be used easily.

Although the image of FIG. 1 shows a barcode acquired by a two-dimensional sensor, according to a further embodiment, the method of the invention is also applicable by using a linear sensor having a single line of pixels 100, as will be better illustrated below.

By means of a succession of scanning lines that are not identical to one another, that are not illustrated in the figures, acquired at different instants of time from the same barcode, and by means of suitable calculation methods such as, for example, determining the maximum position of the correlation function between two scanning lines, it will be possible to calculate, with respect to a predetermined scanning line assumed as a reference, a second correlating parameter CP to be assigned to each scanning line with respect to the predetermined scanning line.

As a result it is possible to define the second ordered set of scanning lines, each having a different value of the second correlating parameter CP and each comprising a first set of pixels, ordered according to a first index. It will thus be possible to define a third set of pixels in which each pixel has a position identified by a first index and by a second index.

The second index corresponds, in the case of a linear sensor, to the calculated value of the second correlating parameter CP whilst the first index is an ordering index of the pixel in the respective scanning line, that is called C, even if improperly, by analogy with the terminology used previously for the two-dimensional sensors.

It is thus possible to assign to each pixel of the third set a shift value S. In particular, if CP is associated with a predetermined scanning line, the shift value S of a pixel in a scanning line identified by a value for the first index equal to C and for the second index equal to CP, is to be calculated according to Formula 8, set out below:

$$S=CP+C \qquad 8)$$

It should thus be noted that the application of the present method can also be extended to a reader provided with a linear sensor.

In use, in the case of a linear set of pixels, a second set of scanning lines is obtained in which each line is acquired at different instants of time from the same barcode. From this second set a predetermined scanning line is selected and for each acquired scanning line the respective second correlating parameter CP is calculated. From the second set of acquired scanning lines the third set of pixels is thus identified, each identified by a first index C and by a second index, equal to the second correlating parameter CP, from which, owing to the Formula 8) indicated above, the fifth set of shift values S is subsequently identified.

As a result, the fourth set of pixels can be selected from the fifth set of shift values S, and, in the case of shift values S distributed in a non-uniform manner, equidistant shift values SE and respective intensity values are preferentially calculated from which it is possible to construct the oversampled profile of the barcode, as illustrated previously.

The coding method for coding a barcode according to the present invention is implemented in a programme that comprises a dedicated code that is advantageously executed in a barcode reader.

It should be noted that the programme can be performed both in a barcode reader comprising a two-dimensional sensor and in a barcode reader comprising a linear sensor, inasmuch as the programme is able to recognise the type of reader in which it has been installed and is thus able to obtain in a suitable manner the second ordered set of scanning lines from which it is possible to construct the oversampled profile of the barcode.

What is claimed is:

1. A method for decoding a linear barcode in an image, by a sensor having a set of pixels, the method comprising:
   a) selecting a predetermined scanning line, comprising a first ordered set of pixels, in which each pixel is identified by a first index and has a respective individual impinged intensity value;
   b) decoding said barcode by constructing a profile of said barcode from the individual impinged intensity values of said pixels of said predetermined scanning line;
   c) obtaining a second set of scanning lines, which also comprises said predetermined scanning line, in which said scanning lines are ordered according to a second index and each scanning line comprises a respective first set of pixels for defining a third set of pixels, each identified by said first index and by said second index and having a respective individual impinged intensity value; and
   d) selecting a fourth ordered set of pixels from said third set of pixels and constructing an oversampled profile of said barcode by ordering individual impinged intensity values from the individual impinged intensity values of said pixels of said fourth set, said fourth set of pixels comprising pixels of said predetermined scanning line and further pixels of said third set that do not belong to said predetermined scanning line, to obtain a subpixel resolution that is able to decode said barcode wherein said selecting a fourth ordered set of pixels comprises:
   e) calculating, for each pixel of said third set a corresponding exact shift value depending on the value of said first index and of said second index of said pixel; and
   f) processing said exact shift values thus obtaining an ordered fifth set of said exact shift values, each exact shift value of said fifth set being associated with a respective pixel of said third set; and
   g) each pixel of said fourth set of pixels being selected and ordered according to the order indicated by said fifth set of exact shift values.

2. The method according to claim 1 wherein said processing said shift values comprises ordering said shift values in ascending order to obtain said fifth ordered set of shift values.

3. The method according to claim 1, wherein said ordering intensity values from intensity values of said pixels of said fourth set comprises assigning to each pixel of said fourth set the intensity value of said pixel and associating said intensity value with the respective shift value of said fifth set.

4. The method according to claim 1, wherein said method further comprises defining a sixth predetermined set of equidistant reference shift values and assigning to each equidistant shift value a respective intensity value calculated from intensity values of said pixels of said fourth set.

5. The method according to claim 4, wherein said method further comprises comparing each of said equidistant shift values with the shift values of said fifth set for identifying a first shift value of said fifth set having a minimum excess difference with respect to said equidistant shift value and a second shift value of said fifth set having a minimum defect difference with respect to said equidistant shift value.

6. The method according to claim 5, wherein said assigning a respective calculated intensity value to each equidistant shift value comprises interpolating the intensity value of a first pixel of said fourth set corresponding to said first shift value and a second intensity value of a second pixel of said fourth set corresponding to said second shift value and assigning said interpolated intensity value to said equidistant shift value.

7. The method according to claim 6, wherein said interpolating said first intensity value and said second intensity value comprises performing a weighted average, the weights of which derive from said minimum excess difference and from said minimum defect difference.

8. The method according to claim 1, wherein said obtaining said second set of scanning lines comprises acquiring a two-dimensional set of pixels by means of a reader using a two-dimensional sensor, said first index being a column index and said second index being a row index.

9. The method according to claim 8, wherein said method further comprises, after said obtaining said second set of scanning lines, calculating the tilt of said barcode with respect to a reference axis, before selecting said fourth set of pixels from said third set.

10. The method according to claim 9, wherein calculating said tilt comprises calculating a first parameter associated with the tilt of said barcode with respect to said reference axis, said reference axis being in particular a vertical reference axis.

11. The method according to claim 10, wherein calculating said first parameter comprises calculating the tangent of $\alpha$, $\alpha$ being the angle between said barcode and said reference axis and wherein said parameter is the tangent of $\alpha$.

12. The method according to claim 11, wherein said calculating a corresponding shift value for each pixel of said third set is equivalent to multiplying said row index to the tangent of $\alpha$ and adding the result to said column index.

13. The method according to claim 9, wherein said method further comprises analyzing said two-dimensional set of pixels to determine a first black bar of said code.

14. The method according to claim 13, wherein calculating said tilt of said barcode comprises calculating the tilt between said first black bar and said reference axis, said reference axis being in particular a vertical reference axis.

15. The method according to claim 8, wherein selecting said first set of pixels further comprises selecting any of said pixel inside said barcode and considering said selected pixel as the initial pixel of said predetermined scanning line, assigning a value equal to 0 to said row index and to said column index of said selected pixel.

16. The method according to claim 15, wherein said method further comprises analyzing said two-dimensional set of pixels to determine a first black bar of said code and calculate the height of said barcode as the distance between a first end vertex and a second end vertex of said first black bar.

17. The method according to claim 16, wherein said method further comprises selecting said initial pixel substantially halfway along the height of said first black bar.

18. The method according to claim 8, wherein said row index increases by one unit moving upwards in said third set of pixels.

19. The method according to claim 8, wherein said column index increases by one unit moving to the right in said first set of pixels.

20. The method according to claim 1, wherein said barcode is arranged tilted in said image with respect to a reference axis, and forms an angle equal to 0°, 45°, 90°, 135°, 270°, 315° and 360° with respect to said reference axis, and wherein said method further comprises changing the reciprocal position between said image and said sensor having said set of pixels.

21. The method according to claim 1, wherein said barcode is arranged tilted in said image with respect to a reference axis, and said barcode forms an angle comprised between 0° and 45°, between 45° and 90°, between 90° and 135°, between 135° and 270°, between 270° and 315° and between 315° and 360° with respect to said reference axis.

22. The method according to claim 1, wherein said obtaining said second set of scanning lines comprises acquiring from the barcode each scanning line by means of a linear pixel sensor at various instants.

23. The method according to claim 22, wherein each acquired scanning line is processed by means of a correlation with said predetermined scanning line and from said correlation a second correlating parameter is calculated that is associated with said scanning line.

24. The method according to claim 23, wherein each pixel of each scanning line is identified by said first index, that corresponds to an ordering index of said pixel in said respective scanning line, and by said second index, which corresponds to said second correlating parameter.

25. The method according to claim 1, wherein said obtaining said second set of scanning lines comprises acquiring from the barcode each scanning line by means of a linear pixel sensor at various instants, and wherein said calculating for each pixel of said third set a corresponding shift value is the equivalent of adding said second index to said first index.

26. A barcode reader comprising a sensor having a set of pixels, the barcode reader being programmed with code for decoding a barcode comprising:
   first code for selecting a predetermined scanning line, comprising a first ordered set of pixels, in which each pixel is identified by a first index and has a respective individual impinged intensity value;
   second code for decoding said barcode by constructing a profile of said barcode from individual impinged intensity values of said pixels of said predetermined scanning line;
   third code for obtaining a second set of scanning lines, which also comprises said predetermined scanning line, in which said scanning lines are ordered according to a second index and each scanning line comprises a respective first set of pixels for defining a third set of pixels, each identified by said first index and by said second index and having a respective individual impinged intensity value; and
   fourth code for selecting a fourth ordered set of pixels from said third set of pixels and constructing an oversampled profile of said barcode by ordering individual impinged intensity values from the individual impinged intensity values of said pixels of said fourth set, said fourth set of pixels comprising pixels of said predetermined scanning line and further pixels of said third set that do not belong to said predetermined scanning line, to obtain a subpixel resolution that is able to decode said barcode, wherein said selecting a fourth ordered set of pixels comprises code for:

calculating, for each pixel of said third set a corresponding exact shift value depending on the value of said first index and of said second index of said pixel; and processing said shift values thus obtaining an ordered fifth set of said exact shift values, each exact shift value of said fifth set being associated with a respective pixel of said third set, each pixel of said fourth set of pixels being selected and ordered according to the order indicated by said fifth set of exact shift values.

27. The barcode reader according to claim 26, wherein said sensor having a two-dimensional set of pixels and wherein said third code comprises code for obtaining said second set of scan lines by acquiring the two-dimensional set of pixels using the sensor, said first index being a column index and said second index being a row index.

28. The barcode reader according to claim 26, wherein said sensor having a linear set of pixels and wherein said third code comprises code for acquiring from the barcode each scanning line by means of the sensor at various instants.

29. Computer-readable media tangibly embodying a programme that comprises code for decoding a barcode when the programme is run in a barcode reader, the computer-readable media comprising code to:

select a predetermined scanning line, comprising a first ordered set of pixels, in which each pixel is identified by a first index and has a respective individual impinged intensity value;

decode said barcode by constructing a profile of said barcode from the individual impinged intensity values of said pixels of said predetermined scanning line;

obtain a second set of scanning lines, which also comprises said predetermined scanning line, in which said scanning lines are ordered according to a second index and each scanning line comprises a respective first set of pixels for defining a third set of pixels, each identified by said first index and by said second index and having a respective individual impinged intensity value; and select a fourth ordered set of pixels from said third set of pixels and constructing an oversampled profile of said barcode by ordering individual impinged intensity values from the individual impinged intensity values of said pixels of said fourth set, said fourth set of pixels comprising pixels of said predetermined scanning line and further pixels of said third set that do not belong to said predetermined scanning line, to obtain a subpixel resolution that is able to decode said barcode, wherein said code to select a fourth ordered set of pixels comprises code to:

calculate, for each pixel of said third set a corresponding exact shift value depending on the value of said first index and of said second index of said pixel; and process said shift values thus obtaining an ordered fifth set of said exact shift values, each exact shift value of said fifth set being associated with a respective pixel of said third set, each pixel of said fourth set of pixels being selected and ordered according to the order indicated by said fifth set of exact shift values.

* * * * *

UNITED STATES PATENT AND TRADEMARK OFFICE
CERTIFICATE OF CORRECTION

PATENT NO. : 8,915,443 B2  
APPLICATION NO. : 13/517345  
DATED : December 23, 2014  
INVENTOR(S) : Deppieri et al.

Page 1 of 1

It is certified that error appears in the above-identified patent and that said Letters Patent is hereby corrected as shown below:

In the claims

Column 12, line 43, Claim 1 insert a --,-- after "barcode"

Column 12, line 55, Claim 2 insert a --,-- after "claim 1"

Signed and Sealed this  
Twenty-first Day of April, 2015

Michelle K. Lee  
*Director of the United States Patent and Trademark Office*